US006176915B1

(12) United States Patent
Franke et al.

(10) Patent No.: US 6,176,915 B1
(45) Date of Patent: Jan. 23, 2001

(54) SORGHUM MEAL-BASED BIODEGRADABLE FORMULATIONS, SHAPED PRODUCTS MADE THEREFROM, AND METHODS OF MAKING SAID SHAPED PRODUCTS

(75) Inventors: Hans G. Franke, Incline Village, NV (US); Donald R. Bittner, Irving, TX (US)

(73) Assignee: Standard Starch, L.L.C., Tampa, FL (US)

( * ) Notice: Under 35 U.S.C. 154(b), the term of this patent shall be extended for 0 days.

(21) Appl. No.: 09/035,597

(22) Filed: Mar. 5, 1998

Related U.S. Application Data

(63) Continuation of application No. 08/421,720, filed on Apr. 14, 1995, now Pat. No. 5,766,529.

(51) Int. Cl.$^7$ .................................................. C08L 3/00
(52) U.S. Cl. .................................. 106/125.1; 106/129.1; 524/47
(58) Field of Search ..................... 426/496; 524/47; 106/125.1, 129.1

(56) References Cited

U.S. PATENT DOCUMENTS

| | | | |
|---|---|---|---|
| 3,137,592 | 6/1964 | Protzman et al. | 127/32 |
| 3,765,917 | 10/1973 | Hijiya et al. | 106/126 |
| 3,931,068 | 1/1976 | Clendinning et al. | 524/14 |
| 4,076,846 | 2/1978 | Nakatsuka et al. | 426/62 |
| 4,079,025 | 3/1978 | Young et al. | 525/54.3 |
| 4,125,495 | 11/1978 | Griffin | 260/17.5 |
| 4,133,784 | 1/1979 | Otey et al. | 260/17.4 |
| 4,158,574 | * 6/1979 | Cummisford et al. | 127/38 |
| 4,337,181 | 6/1982 | Otey et al. | 523/128 |
| 4,454,268 | 6/1984 | Otey et al. | 524/47 |
| 4,673,438 | 6/1987 | Wittwer et al. | 106/126 |
| 4,863,655 | 9/1989 | Lacourse et al. | 264/53 |
| 5,032,337 | 7/1991 | Nachtergaele et al. | 264/141 |
| 5,035,930 | 7/1991 | Lacourse et al. | 428/35.6 |
| 5,043,196 | 8/1991 | Lacourse et al. | 428/35.6 |
| 5,059,642 | 10/1991 | Jane et al. | 524/52 |
| 5,087,650 | 2/1992 | Willett | 524/47 |
| 5,095,054 | 3/1992 | Lay et al. | 524/47 |
| 5,108,677 | 4/1992 | Ayres | 264/112 |
| 5,158,810 | 10/1992 | Oishi et al. | 428/35.4 |
| 5,160,368 | * 11/1992 | Begovich | 106/154.1 |
| 5,185,382 | 2/1993 | Neumann et al. | 521/84.1 |
| 5,186,990 | 2/1993 | Starcevich | 428/35.6 |
| 5,208,267 | 5/1993 | Neumann et al. | 521/71 |
| 5,248,702 | 9/1993 | Neumann et al. | 521/84.1 |
| 5,252,271 | 10/1993 | Jeffs | 264/54 |
| 5,258,430 | 11/1993 | Bastioli et al. | 524/52 |
| 5,279,658 | 1/1994 | Aung | 106/126.1 |
| 5,280,055 | 1/1994 | Tomka | 524/47 |
| 5,288,318 | 2/1994 | Mayer et al. | 106/126.3 |
| 5,292,782 | 3/1994 | Bastioli et al. | 524/47 |
| 5,306,327 | 4/1994 | Dingeman et al. | 75/313 |
| 5,314,754 | 5/1994 | Knight | 428/532 |
| 5,317,119 | 5/1994 | Ayres | 219/734 |
| 5,321,064 | 6/1994 | Vaidya et al. | 524/56 |
| 5,322,866 | 6/1994 | Mayer et al. | 524/47 |
| 5,340,598 | * 8/1994 | Hay, Jr. et al. | 426/496 |
| 5,362,778 | 11/1994 | Famili et al. | 524/50 |
| 5,384,170 | 1/1995 | Bastioli et al. | 428/34.1 |
| 5,393,804 | 2/1995 | George et al. | 523/128 |
| 5,397,834 | 3/1995 | Jane et al. | 525/54.1 |
| 5,403,875 | 4/1995 | Bortnick et al. | 524/47 |
| 5,409,973 | 4/1995 | Bastioli et al. | 524/53 |
| 5,413,855 | 5/1995 | Kolaska et al. | 428/320.2 |
| 5,427,614 | 6/1995 | Wittwer et al. | 106/213 |
| 5,466,078 | 11/1995 | Vaidya et al. | 524/17 |
| 5,506,046 | 4/1996 | Andersen et al. | 428/34.5 |
| 5,508,072 | 4/1996 | Andersen et al. | 428/345 |
| 5,512,090 | 4/1996 | Franke et al. | 106/154.1 |
| 5,512,378 | 4/1996 | Bastioli et al. | 428/484 |
| 5,512,617 | 4/1996 | Ritter et al. | 524/264 |
| 5,525,281 | 6/1996 | Lorcks et al. | 264/101 |
| 5,545,450 | 8/1996 | Andersen et al. | 428/34.5 |
| 5,580,624 | 12/1996 | Andersen et al. | 428/34.5 |
| 5,582,670 | 12/1996 | Andersen et al. | 156/242 |
| 5,589,518 | 12/1996 | Bastioli et al. | 521/55 |
| 5,618,341 | 4/1997 | Andersen et al. | 106/287.35 |
| 5,631,053 | 5/1997 | Andersen et al. | 106/287.35 |
| 5,658,603 | 8/1997 | Andersen et al. | 106/287.35 |
| 5,660,900 | 8/1997 | Andersen et al. | 428/35.6 |
| 5,660,903 | 8/1997 | Andersen et al. | 428/36.4 |
| 5,660,904 | 8/1997 | Andersen et al. | 428/36.4 |
| 5,662,731 | 9/1997 | Andersen et al. | 106/206.1 |
| 5,665,442 | 9/1997 | Andersen et al. | 428/36.4 |
| 5,679,145 | 10/1997 | Andersen et al. | 106/162.5 |
| 5,683,772 | 11/1997 | Andersen et al. | 106/36.4 |
| 5,691,014 | 11/1997 | Andersen et al. | 428/434.5 |
| 5,702,787 | 12/1997 | Andersen et al. | 428/36.4 |
| 5,705,203 | 1/1998 | Andersen et al. | 425/407 |
| 5,705,238 | 1/1998 | Andersen et al. | 428/34.5 |
| 5,705,239 | 1/1998 | Andersen et al. | 428/34.5 |
| 5,705,242 | 1/1998 | Andersen et al. | 428/36.4 |

(List continued on next page.)

FOREIGN PATENT DOCUMENTS

| | | |
|---|---|---|
| 0 376 201 | 12/1989 | (EP) . |
| 431203 | 12/1989 | (EP) . |
| 0 712 883 A1 | 11/1995 | (EP) . |
| WO 93/05668 | 4/1993 | (WO) . |
| WO 93/08014 | 4/1993 | (WO) . |
| WO 94/13737 | 6/1994 | (WO) . |
| WO 96/07539 | 3/1996 | (WO) . |
| WO 96/07693 | 3/1996 | (WO) . |

OTHER PUBLICATIONS

European Search Report, dated Jul. 05, 1998.

Primary Examiner—Peter D. Mulcahy
(74) Attorney, Agent, or Firm—Baker Botts L.L.P.

(57) ABSTRACT

Biodegradable sorghum meal-based extruded shaped products or articles and methods of manufacturing the same. In particular, extruded sorghum meal-based products processed by compression, stretching or compression and stretching provide excellent flexibility, pliability, dimensional stability, resiliency, abrasion resistance and other properties making them attractive for use as packaging materials.

10 Claims, 2 Drawing Sheets

U.S. PATENT DOCUMENTS

| | | | |
|---|---|---|---|
| 5,705,536 | 1/1998 | Tomka | 521/84.1 |
| 5,709,913 | 1/1998 | Andersen et al. | 528/34.5 |
| 5,716,675 | 2/1998 | Andersen et al. | 427/384 |
| 5,736,209 | 4/1998 | Andersen et al. | 428/36.4 |
| 5,738,921 | 4/1998 | Andersen et al. | 428/36.4 |
| 5,766,525 | 6/1998 | Andersen et al. | 264/40.1 |
| 5,766,529 | 6/1998 | Franke et al. | 264/143 |
| 5,776,388 | 7/1998 | Andersen et al. | 264/45.5 |
| 5,783,126 | 7/1998 | Andersen et al. | 264/102 |
| 5,786,080 | 7/1998 | Andersen et al. | 428/357 |

* cited by examiner

SORGHUM MEAL-BASED BIODEGRADABLE FORMULATIONS, SHAPED PRODUCTS MADE THEREFROM, AND METHODS OF MAKING SAID SHAPED PRODUCTS

This is a continuation of U.S. patent application Ser. No. 08/421,720, filed Apr. 14, 1995 U.S. Pat. No. 5,766,529.

FIELD OF THE INVENTION

The invention relates, according to one embodiment, to new sorghum-based biodegradable formulations. Pursuant to another embodiment, the invention relates to new methods and processes for the manufacture of novel sorghum-based biodegradable formulations. According to a further embodiment, the invention relates to new biodegradable shaped articles manufactured utilizing: (1) the inventive sorghum-based formulations, and (2) the inventive methods and processes of the present invention.

BACKGROUND OF THE INVENTION

Biodegradable materials are presently in high demand for applications in packaging materials. Commonly used polystyrene ("Styrofoam" (Trademark)), polypropylene, polyethylene, and other non-biodegradable plastic-containing packaging materials are considered detrimental to the environment and may present health hazards. The use of such non-biodegradable materials will decrease as government restrictions discourage their use in packaging applications. Biodegradable materials that are flexible, pliable and non-brittle are needed in a variety of packaging applications, particularly for the manufacture of shaped biodegradable containers for food packaging.

For such applications, the biodegradable material must have mechanical properties that allow it to be formed into and hold the desired container shape, be resistant to collapsing, tearing or breaking.

Starch is an abundant, inexpensive biodegradable polymer. A variety of biodegradable based materials have been proposed for use in packaging applications. Conventional extrusion of these materials produces expanded products that are brittle, sensitive to water and unsuitable for preparation of packaging materials. Attempts to prepare biodegradable products with flexibility, pliability or resiliency and other mechanical properties acceptable for various biodegradable packaging applications have generally focused on chemical or physico-chemical modification of starch, the use of expensive high amylose starch or mixing starch with synthetic polymers to achieve the desired properties while retaining a degree of biodegradability. A number of references relate to extrusion and to injection molding of starch-containing compositions.

U.S. Pat. No. 5,160,368 discloses a biodegradable package for fast food comprising a heat-molded body of a moldable composition which consists essentially of an admixture of fully biodegradable natural materials comprising flour from edible gramineous plants, crushed gramineous hay, a minor proportion of preserving agents, and a plasticizing agent for providing a starting moldable dough suitable for being molded into the shaped fast food package. The patent discloses the flour may be derived from any edible gramineous plants including corn, wheat, and sorghum.

U.S. Pat. No. 5,288,318 discloses a method and composition for making biodegradable injection molded parts from 30% to 70% cellulose acetate, 10% to 60% unmodified raw (whole) starch, and 5% to 35% plasticizer including glycerols and glycerol acetates. Other ingredients that can be used include: starch, flour and paper acetates; gelatin; boric acid; and agricultural fillers. The solid ingredients are combined and fed to an extruder used to make pellets or to feed injection molding equipment. The resulting parts are clear to white or colorful depending upon the added filler materials. The plastics formed are water resistant, high strength and biodegradable. The starch source may be selected from the group consisting of corn, tapioca, potato, sago, wheat, rye, pea, sorghum, rice and arrowroot, and in embodiments where the starch is corn starch, the corn starch may contain between about 30% and 75% amylose.

U.S. Pat. Nos. 5,321,064 and 5,444,078 disclose a biodegradable interpolymer and composition prepared by the reactive blending of a synthetic polymer having functional groups with a naturally occurring biodegradable polymer such as a carbohydrate or protein compound. During reactive blending, the synthetic polymer is said to undergo a chemical reaction with the biodegradable natural polymer which results in covalent and physical bonding between the two polymers, thereby forming an interpolymer. By this process, a biodegradable interpolymer composition is produced that is suitable for molding various articles. It is disclosed that a variety of naturally occurring biodegradable materials can be employed in producing the biodegradable interpolymers and compositions. Such natural polymer materials disclosed include carbohydrates such as starch and cellulose, lignin, proteins, nucleic acids, amino acids, and lipids, which are all biodegradable. These natural polymers can be used either separately or in various mixtures in formulating the interpolymer and composition of the invention. The above natural polymers can be derived from corn, wheat, potato, sorghum, tapioca, rice, arrow root, sago, soybean, pea, sunflower, peanut, gelatin, milk, eggs, etc.

U.S. Pat. No. 5,397,834 provides biodegradable, thermoplastic compositions made of the reaction product of a starch aldehyde with protein. According to the disclosure, the resulting products formed with the compositions possess a smooth, shiny texture, and a high level of tensile strength, elongation, and water resistance compared to articles made from native starch and protein Suitable starches which may be modified and used according to the invention include those derived, for example, from corn including maize, waxy maize and high amylose corn; wheat including hard wheat, soft wheat and durum wheat; rice including waxy rice; and potato, rye, oat, barley, sorghum, millet, triticale, amaranth, and the like. The starch may be a normal starch (about 20–30 wt % amylose), a waxy starch (about 0–8 wt % amylose), or a high-amnylose starch (greater than about 50 wt % amylose).

U.S. Pat. Nos. 4,133,784, 4,337,181, 4,454,268, 5,322, 866, 5,362,778, and 5,384,170 relate to starch-based films that are made by extrusion of destructurized or gelatinized starch combined with synthetic polymeric materials. U.S. Pat. No. 5,322,866 specifically concerns a method of manufacture of biodegradable starch-containing blown films that includes a step of extrusion of a mixture of raw unprocessed starch, copolymers including polyvinyl alcohol, a nucleating agent and a plasticizer. The process is said to avoid the need for pre-processing of the starch. U.S. Pat. No. 5,409,973 reports biodegradable compositions made by extrusion from destructurized starch and an ethylenevinyl acetate copolymer.

U.S. Pat. No. 5,087,650 relates to injection-molding of mixtures of graft polymers and starch to produce partially biodegradable products with acceptable elasticity and water stability.

U.S. Pat. No. 5,258,430 relates to the production of biodegradable articles from destructurized starch and chemically-modified polymers, including chemically-modified polyvinyl alcohol. The articles are said to have improved biodegradability, but to retain the mechanical properties of articles made from the polymer alone.

U.S. Pat. No. 5,292,782 relates to extruded or molded biodegradable articles prepared from mixtures of starch, a thermoplastic polymer and certain plasticizers.

U.S. Pat. No. 5,403,875 relates to blends of starch with acrylic polymers which are melt-processed into thermoplastic articles.

U.S. Pat. No. 5,393,804 relates to biodegradable compositions made from starch melts containing converted starch and plasticizers including polyvinyl alcohol.

U.S. Pat. No. 5,095,054 concerns methods of manufacturing shaped articles from a mixture of destructurized starch and a polymer.

U.S. Pat. No. 4,125,495 relates to a process for manufacture of meat trays from biodegradable starch compositions. Starch granules are chemically modified, for example with a silicone reagent, blended with polymer or copolymer and shaped to form a biodegradable shallow tray.

U.S. Pat. No. 4,673,438 relates to extrusion and injection molding of starch for the manufacture of capsules.

U.S. Pat. No. 5,427,614 also relates to a method of injection molding in which a non-modified starch is combined with a lubricant, texturizing agent and a melt-flow accelerator.

U.S. Pat. Nos. 4,863,655, 5,035,930 and 5,043,196 report expanded starch materials in which the starch has at least 45% by weight amylose (high amylose materials). Expanded high amylose starch compositions have also been modified by reaction with oxiranes (e.g. ethylene oxide) and include the commercially available "ECO-FOAM" (Trademark) in which the starch is modified by reaction with propylene oxide. Expanded packaging materials made from high amylose starch are too expensive for practical commercial use.

U.S. Pat. No. 5,314,754 of Knight (May 24, 1994) reports the production of shaped articles from high amylose starch.

EP published application no. 712883 (published May 22, 1996) relates to biodegradable, structured shaped products with good flexibility made by extruding starch having defined large particle size (e.g., 400 to 1500 microns). The application only exemplifies the use of high amylose starch and chemically-modified high amylose starch.

U.S. Pat. No. 5,512,090 refers to an extrusion process for the manufacture of resilient, low density biodegradable packaging materials, including loose-fill materials, by extrusion of starch mixtures comprising polyvinyl alcohol (PVA) and other ingredients. The patent refers to a minimum amount of about 5% by weight of PVA.

U.S. Pat. No. 5,186,990 reports a lightweight biodegradable packaging material produced by extrusion of corn grit mixed with a binding agent (guar gum) and water. Corn grit is said to contain among other components starch (76–80%), water (12.5–14%), protein (6.5–8%) and fat (0.5–1%).

U.S. Pat. No. 5,208,267 reports biodegradable, compressible and resilient starch-based packaging fillers with high volumes and low weights. The products are formed by extrusion of a blend of non-modified starch with polyalkylene glycol or certain derivatives thereof and a bubble-nucleating agent, such as silicon dioxide.

U.S. Pat. No. 5,252,271 of Hyrum (Oct. 12, 1993) reports a biodegradable closed cell light weight packaging material formed by extrusion of a modified starch. Non-modified starch is reacted in an extruder with certain mild acids in the presence of water and a carbonate compound to generate $CO_2$. Resiliency of the product is said to be 60% to 85%, with density less than 0.032 $g/cm^3$.

U.S. Pat. No. 3,137,592 relates to gelatinized starch products useful for coating applications produced by intense mechanical working of starch/plasticizer mixtures in an extruder. Related coating mixtures are reported in U.S. Pat. No. 5,032,337 which are manufactured by the extrusion of a mixture of starch and polyvinyl alcohol. Application of thermomechanical treatment in an extruder is said to modify the solubility properties of the resultant mixture which can then be used as a binding agent for coating paper.

While significant progress has been made toward non-brittle, biodegradable packaging materials, there nevertheless remains a significant need for lowering production costs and improving the physical and mechanical properties of products produced therefrom.

SUMMARY OF THE INVENTION

The present invention provides methods for producing biodegradable expanded sorghum meal-based products with excellent properties for packaging applications. These methods comprise the steps of extruding a sorghum meal-containing mixture through an expansion die, followed by compressing the extrudate, for example, by subjecting the extrudate to pressure generally perpendicular to the direction of extrusion. Compression can be applied, for example, by use of a rolling device. The extrusion can be performed using conventional methods and apparatus. Die size, die shape and/or type of compression used, e.g., roller configuration, are selected to produce a shaped, compressed or rolled extrudate. The compressed or rolled extrudate is optionally subjected to further shaping, molding and/or cutting to obtain a desired final shaped article to suit the planned application.

It has been found that compressing, or compression combined with stretching of the sorghum meal-based extrudate significantly improves the flexibility, pliability, mechanical strength and dimensional stability of extruded, pressure molded packaging containers. The preferred method for compression of the extrudate is by rolling. It has also been found that compression or rolling improves the resiliency of extruded, low density expanded sorghum meal-based articles. Significant decreases in the brittleness of extruded sorghum meal-based products are achieved by compressing, rolling, compressing and stretching or rolling and stretching of the material after extrusion. Application of the methods of this invention, preferably allows for the production of expanded sorghum meal-based packaging materials having mechanical properties suitable for packaging application while not using expensive polymeric plasticizers, e.g., polyols such as polyvinyl alcohol.

In a method of the present invention, pressure can be applied to the emerging extrudate in a direction generally perpendicular to the direction of extrusion. Pressure is preferably applied substantially perpendicular to the direction of extrusion. The pressure applied is preferably sufficient to substantially compress the cells in the extrudate. Surprisingly, it is believed that substantially compressing, or preferably crushing, the cells of the expanded product significantly improves the flexibility, pliability or resiliency of the product and significantly reduces brittleness. The preferred method of applying pressure to the extrudate is rolling the extrudate between opposed rollers. The amount of pressure applied may be varied dependent upon the desired final properties of the material. Rolling is preferably done while the extrudate is still hot. The preferred distance from the exit point of the extrudate from the extruder die to the roller depends upon the desired final properties of the article.

In another aspect, the present invention provides a method of producing novel expanded sorghum meal-based products comprising the steps of extruding a sorghum meal-based mixture through an expansion die, followed by stretching the extrudate, for example, by pulling the extrudate in the direction of extrusion. Stretching can be applied, for example, by pulling the extrudate strand, substantially in the direction of extrusion, faster than the rate of extrusion. Extrusion can be performed using conventional methods and apparatus. Die size, die shape and/or stretching rate applied are adjusted to provide desired final properties in the extruded product. The stretched extrudate is optionally subjected to further shaping, molding and/or cutting to obtain a desired final shaped article to suit the planned application. Stretching of the extrudate significantly improves the final properties of shaped extruded articles, including pressure molded packaging containers.

In one embodiment of the method of the present invention, the extrudate is compressed without substantial stretching. The preferred way to achieve compression without substantial stretching is to employ rollers in which roller speed is substantially matched to the rate of extrusion, so that minimal lateral pressure is applied to stretch the extrudate. In another embodiment of the method, the extrudate is stretched, for example by pulling the extrudate strand as it exits the die at a rate faster than the extrusion rate. Preferred stretch rates range from about 1.1 to about 1.5.

In yet another embodiment of the method of the present invention, the extrudate is compressed and stretched. The extrudate can be stretched before, after or at the same it is being compressed. Preferably, stretching is applied at the same time as compression. The preferred way to compress and stretch the extrudate is to employ rollers in which the roller speed is set faster than the rate of extrusion. In this case, the extrudate is both rolled and stretched. Roller speeds for stretching are typically set to be less than or equal to 50% faster than the extrusion rate. Preferred roller speeds for stretching are between about 10% to about 20% faster than the extrusion rate. However, the desired amount of stretching is dependent upon the desired final properties of the product as used herein, a roller speed of 10%, 20%, or 50% faster than the extrusion rate means a 1.1, 1.2 or a 1.5 stretch rate of the extrudate, respectively. In addition, the distance between the rollers, i.e., the thickness of the extrudate after compression, is dependent upon the desired final properties of the article.

The compressed, stretched, or compressed and stretched expanded product is biodegradable and has low brittleness and other properties making it attractive for use in packaging applications.

In another embodiment, this invention provides improved molded articles, particularly articles that are pressure molded from extruded compressed, stretched or compressed and stretched sheets. Sheets for pressure molded articles are preferably rolled or rolled and stretched. Molded or shaped articles or products can have various sizes and shapes including shallow and deep trays, cups, tubs, tubes and other containers. Molded articles can also be single or multiple compartment trays or containers and can also be shaped with internal or external ridges, lips, or rims. The extrudate is rolled and/or stretched prior to pressure molding. Pressure molding can employ conventional processes and equipment.

The methods of this invention can be employed essentially with any sorghum meal-based composition suitable for extrusion. In particular and preferably, the method can be used with compositions in which the major ingredient is raw non-modified sorghum meal. The method of this invention eliminates the need to use chemical plasticizers, like PVA, in the extruder feed composition.

The invention also provides extruder feed mixtures containing raw, non-modified starch for production of expanded sorghum meal/starch products which contain no chemical plasticizers, such as PVA and related polyols. The extruder feed mixtures may contain PVA or related polyhydric plasticizers, if desired. However, the preferred extruder feed compositions or mixtures contain no PVA.

It has been found that lighter weight expanded articles and expanded pressure molded articles with good mechanical strength and dimensional stability can be produced by the process of this invention from extruder feed mixtures that contain talc.

In another aspect, the invention provides a new extrusion device in which a conventional extruder is combined with a pressure device which can apply pressure to an extrudate emerging from an extruder die substantially perpendicular to the direction of extrusion. The pressure applied being sufficient to substantially compress or preferably to crush the cells in the hot extrudate. The amount of pressure applied and the length of application time of pressure depends upon the desired final properties of the product.

According to one embodiment, the invention is directed to a biodegradable composition for the production of expanded sorghum meal-based shaped articles wherein the composition comprises about 30% to about 95% by weight sorghum meal.

The composition of the present invention comprises sorghum meal which preferably comprises not less than about 9.4% by weight protein; not less than about 2.0% by weight fat; not more than about 3.0% by weight ash; and not more than about 3.0% by weight fiber. It is understood however, that other sorghum meal formulations may be utilized in the practice of the present invention. According to a further embodiment, the invention is directed to the above composition further comprising up to about 50% by weight additional starch or rice flour. The starch used in the practice of the present invention may be derived from at least one selected from the group consisting of corn, tapioca, potato, sage, wheat, rye, pea, sorghum, rice and arrow root. Preferably, the composition of the present invention, according to one embodiment, comprises additional starch derived from corn.

According to one embodiment, the composition of the present invention may comprise up to about 47% by weight sorghum meal and up to about 47% by weight starch or rice flour, or mixtures thereof. Indeed, according to a further embodiment, the composition of the present invention may comprise up to about 32% by weight sorghum meal, up to about 32% by weight corn starch, and up to about 32% by weight rice flour.

According to another embodiment, the invention is directed to a method for producing an expanded sorghum meal-based article which comprises the steps of (a) introducing an extruder feed composition comprising from about 20% to about 95% by weight sorghum meal into a twin-screw extruder; (b) extruding said composition through a die to generate an extrudate having cells; and (c) applying pressure to said extrudate to substantially compress the cells in said extrudate.

According to a preferred embodiment, the method of the present invention is performed wherein pressure is applied by rolling the extrudate. And the method of the present invention may further comprise the step of shaping said rolled extrudate by pressure molding. The shaped article produced by the method of the present invention may be a tray. The methods of the present invention may include the step of applying pressure by rolling the extrudate and also stretching the extrudate. The methods of the present invention may include the step of shaping a rolled, stretched extrudate by pressure molding. Preferably, when practicing a method of the present invention pressure is applied to the extrudate while it is hot.

According to another embodiment, the methods of the present invention include extruder feed compositions which comprise up to 20% by weight, preferably up to 10% by weight, recycled extrudate and articles produced by said method.

According to yet a further embodiment, the present invention is directed to a method of pressure molding a shaped expanded sorghum meal-based article which comprises the steps of (a) introducing an extruder feed composition comprising from about 20% to about 95% by weight sorghum meal into an extruder; (b) extruding said composition through a die to generate an extrudate; and (c) applying pressure to the extrudate to compress and shape said extrudate to form said article. Preferably, the methods of the present invention are performed wherein the extrudate is compressed to form a sheet before being shaped. Most preferably, the methods of the present invention are performed wherein said compressed extrudate sheet is produced by rolling said extrudate.

According to still a further embodiment, the invention is directed to an extruder feed composition consisting essentially of the following components: (a) sorghum meal in an amount ranging from about 20% to about 95% by weight; (b) additional starch, rice flour, or mixtures thereof in an amount ranging from about 0% to about 75% by weight; (c) talc in an amount ranging from 0% up to about 15% by weight; and (d) a blowing agent in an amount ranging from 0% up to about 1.5% by weight, with the proviso that the extruder feed composition must contain a nucleating agent.

According to one embodiment, the above-identified extruder feed composition may comprise up to about 50% by weight starch or rice flour.

Additional aspects and features of the invention will become apparent in the following detailed description of the invention.

DETAILED DESCRIPTION OF THE INVENTION

Figure 1:
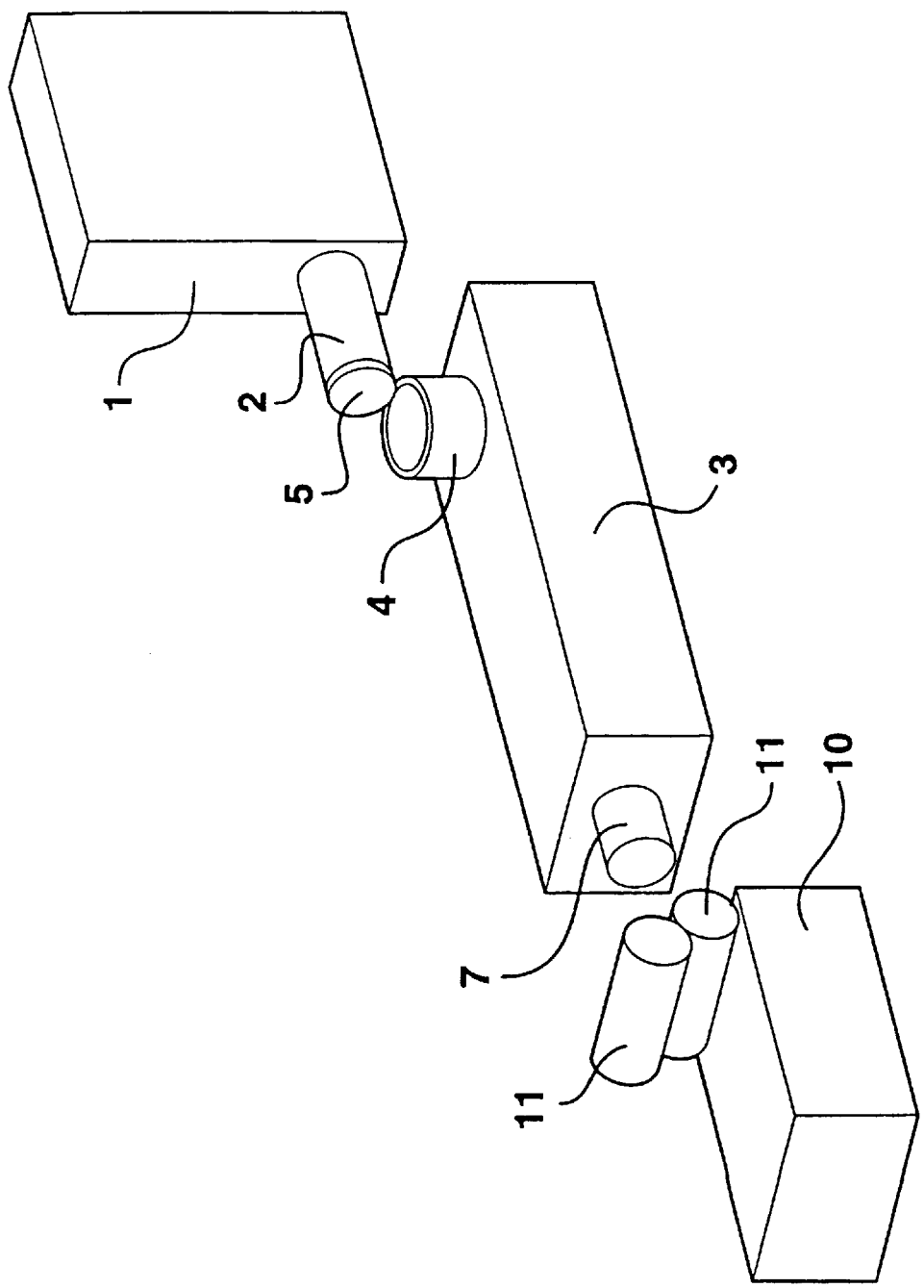
FIG. 1 is a schematic drawing of an extrusion/rolling or extrusion/rolling and stretching device useful in practicing the methods of this invention.

The process of making shaped extruded sorghum meal-based articles of this invention is described by reference to the schematic manufacturing extrusion apparatus of FIG. 1. Sorghum meal mixed with desired additives, for example in an attached feeder (1), is fed through a feed tube (2) and introduced into the mixing compartment of an extruder (3), preferably a twin screw extruder, for example through an inlet (4). The feed tube (2) contains a flow smoother (5). The mixture is further mixed and blended, subjected to shearing, increasing temperature and pressure in the extruder to form a mass which is forced through an expanding die (7). The mass is preferably a homogenous hot melt. Preferably, the mass is plasticized.

Figure 2:
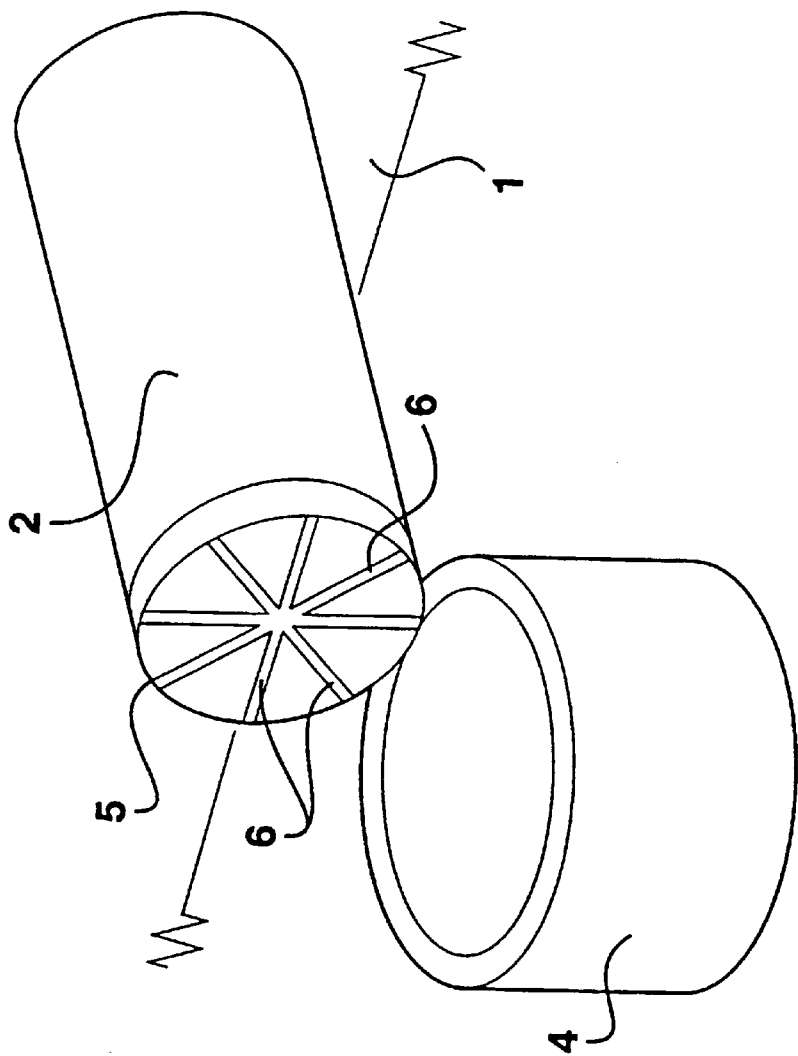
FIG. 2 is a schematic drawing of a flow smoother employed in the device of FIG. 1.

As shown in more detail in FIG. 2, the feed tube (2) of the feeder (1) contains a flow smoother (5). This device functions to ensure consistent feed to the extruder to minimize or prevent surging of feed into the extruder. The device comprises arms or spokes (6) that traverse the mouth of the feed tube. Most simply, the device can comprise a set of crossed wires secured at and across the mouth of the feed tube. Other configurations of the flow smoother will be readily apparent to those of ordinary skill in the art. It has been found that the quality of the extruded material, particularly the quality of extruded sheets is significantly improved, if a flow smoother is employed.

The shape of the die determines the shape of the extruded strand and die shape is typically chosen to prepare a desired shape of expanded product. The mixture is typically extruded out of the die at a pressure of about 700 to 2000 psi and the extrudate is at a temperature of about 100° C. to about 200° C. upon exiting the extruder. The extruder is typically heated and can have several zones along its length in which temperature is separately adjustable.

For preparation of pressure molded expanded articles, including trays, the extrudate is preferably formed as a tube by use of an annular or tubular extruder die. The thickness of the extruded tube is preferably between about 0.1 and 0.05 inches and more preferably between about 0.1 to 0.03 inches. The extruded tube produced is preferably immediately compressed, e.g., by rolling or rolling and stretching, between a pair of flat opposed rollers. Rolling of the tube results in a two-ply sheet. Multi-ply sheets can be formed by overlaying two or more extruded tubes followed by compression or rolling. Alternatively, the extruded tube can be split to form a strip which is then compressed or rolled to give a single-ply sheet. The compressed or rolled sheet is optionally cut, and further shaped. For example, a rolled sheet can be passed into a pressure mold where it is pressed into the shape of the desired product. The resulting shaped article can be finished by smoothing or trimming rough edges and/or by the application of desired coatings. For example, sealants, lubricants, water-resistant or water-repellant coatings can be applied to achieve a desired surface appearance or quality or to minimize loss of water from (or absorption of excess water by) the shaped article. Dyes, fragrances, preservatives, bactericides may also be included or added into the extrudate used to form a shaped article.

The term "sheet" as used herein refers to a generally flat, relatively thin slab of extrudate which is preferably sufficiently thick to allow formation of an expanded sorghum meal-based article which retains dimensional stability. The term "sheet" as used herein is not intended to include films which do not retain dimensional stability. Preferred sheets for preparation of extruded sorghum meal-based articles have a thickness that is greater than about 1/50th of an inch and more preferably greater than about 1/16th of an inch. In general, however, the thickness of the sheet, which is determined in part by choice of die and type of compression or stretching applied, e.g., roller gap, is selected to achieve desired final dimensions and properties in the shaped extruded article.

It has been found to be beneficial to the quality of the final molded product to pinch the ends of the extruded tube prior to compression or rolling. It is believed that pinching the tube end to form a pillow entraps steam that is beneficial during the compression/rolling process to better maintain the temperature of extrudate on compression/rolling or to provide a humid environment for compression/rolling. Provision of a steam box at the end of the extruder to enclose the extrudate as it is passed from the extruder die for compression, e.g., as it is passed to the rollers, will provide similar benefit to the quality of the compressed or rolled material. It has been found that the length of time between rolling and molding has a significant effect on the quality of the resultant molded article. Preferably, the compressed or rolled sheet is immediately passed to the mold for pressure molding. It is believed that an important factor in this step is the temperature of the mold in relation to the temperature of the sheet. The sheet is preferably pressure molded while still hot. Alternatively, the mold itself can be heated or cooled to insure consistent quality of product.

Water can be added to the extrusion system during the residence of the base mixture in the extruder to adjust the consistency of the starch mixture during extrusion and/or to adjust the extent of expansion of the product. Lubricant levels in the extrudate can also be adjusted to improve flow through the extruder. Glycerin levels in the extruder can also be adjusted to improve flow and/or vary properties of the expanded product. There is no requirement to remove water from the base mixture in the extruder prior to extrusion. Specifically, there is no requirement to apply subatmospheric pressure to the extrudate or extruded strand to remove water.

Continuing to refer to FIG. 1, the extrudate strand which exits die (7) is preferably fed through a rolling device (10) having two or more rollers (11) positioned with respect to each other to apply pressure to the strand substantially perpendicular to the direction of extrusion. A multiple set of rollers can be employed, positioned sequentially along the direction of extrusion to sequentially apply pressure to the extrudate. Pressure from each roller employed is preferably applied substantially perpendicular to the direction of extrusion. Each set of rollers can be set to apply the same or different amounts of pressure to the extrudate. The rollers in a given set can form an opening corresponding to the shape of the desired product. For formation of expanded sorghum meal-based sheets, including those which are subsequently optionally pressure molded, one or more pairs of opposed flat rollers can be employed. Preferably, the rollers exert sufficient pressure upon the extrudate to substantially compress the cells, or more preferably crush the cells, in the extrudate. The rollers can also be used to finalize shaping of the expanded product.

The process step of applying pressure to the extrudate, preferably by rolling, results in significantly decreased brittleness of extruded products. The application of pressure as described herein also reduces dustiness and chipping of extruded products and increases bulk density. The roller pressure required to obtain improved properties depends on the shape of the extrudate, cell size and bulk density of the extrudate which in turn depends on the composition of the extrudate including water content. The required roller pressure needed to achieve the desired final properties is readily determined for a particular composition and product shape empirically without the expense of undue experimentation.

Roller speed can be adjusted to substantially match the extrusion rate. If this is done, minimal stretching of extrudate occurs. Alternatively, the roller speed can be adjusted to be somewhat faster than the rate of extrusion. In this case, the extrudate is both rolled and stretched. Compression accompanied by stretching, as applied when an extrudate is rolled and stretched, has surprisingly been found to confer improved properties on sorghum meal-based articles molded using the compressed and stretched extrudate. Roller speeds up to about 50% faster than the extrusion speed can be applied to achieve stretching with compression. Preferred roller speeds for stretching and compression are between about 10% to about 20% faster than the rate of extrusion.

The manufacture of expanded sheets is typically done in a continuous mode by continuous feed into the extruder, extrusion, compression/rolling and cutting.

A conventional twin screw extruder having feed screws, single lead screws, shear paddles (preferably 3 or more, 3–10 being typical) or reverse flight screw elements can be employed in this process. An expanding type screw configuration can be used in the twin-screw extruder Typical residence time of the base mixture (i.e., the sorghum meal with any additives) in the extruder is from about 9 to about 20 seconds and extrusion occurs at a rate of up to 1500 lb/hour.

Generally, the screw speed is typically between about 290 and about 450 RPMs and the specific energy is about 0.06 to about 0.10 hp/lb. hr. The extruder typically has 5 temperature zones and may have the following temperature ranges depending upon the application: zone 1=75°–150° F.; zone 2=150°–300° F.; zone 3=175°–350° F.; zone 4=200°–400° F.; and zone 5=200° F.–400° F.

The size and configuration of the die opening determines the cross-sectional shape of the extrudate. A variety of shapes and sizes of final products can be made. The sorghum meal-based composition can also be extruded as an expanded sheet to make sheets of cushioning material or for further shaping through pressure molding. Typically, product sheets having a thickness of about 1/10 to about 1/4 inch can be made by the extrusion/compression method.

A preferred extrusion die is adjustable in three ways: orifice opening size, concentricity, and back pressure/flow rate. First, the size of the annular orifice is adjusted by extending the outer ring of the die out away from the mandrel or inner ring of the die while the mandrel remains stationary. Because the inner surface of the outer ring is tapered toward the orifice, as the outer ring is extended away from the mandrel, the annular orifice or space between the outer ring and the mandrel becomes larger. Second, the concentricity of the outer ring is adjusted relative to the stationary inner ring or mandrel. Adjusting screws are positioned at opposite sides of the outer ring to push and pull the outer ring from one position to another so that the longitudinal central axis of the outer ring matches the longitudinal central axis of the mandrel. In this manner, the thickness of the annular orifice between the outer ring and the mandrel is adjusted to be equal at all points around the orifice. If the outer ring becomes perturbed from the central location, the adjustment screws are relaxed on one side and applied on the other to pull and push the outer ring back to the central position. Third, the pressure of the biodegradable material is adjusted by inserting spacers between the mandrel and a mounting plate. The biodegradable material is pushed by the extruder through the center of the mounting plate until it reaches the backside of the mandrel where it is further pushed out in radial directions around the backside of the mandrel between the mandrel and the mounting plate. Upon reaching the outer diameter of the mandrel, the biodegradable material is then pushed forward around the outer radial perimeter of the mandrel until it passes through the orifice between the mandrel and the outer ring. The pressure and flow rate of the biodegradable material is adjusted by changing the thickness of the spacers between the mounting plate and the mandrel. If it is desirable to increase the flow rate and decrease the pressure, thicker spacers are inserted between the mounting plate and the mandrel to widen the space between the mounting plate and the mandrel. Alternatively, if it is desirable to reduce the flow rate and increase the pressure, thinner spacers are inserted. In this manner, the extrusion die is fully adjustable relative to the orifice size, the concentricity of the orifice, and the flow rate or back pressure through the die.

Additionally, a preferred extrusion die is a rotating die which twists the biodegradable material as it passes through the orifice between the outer ring and the mandrel. Because many of the polymer molecules within the biodegradable material orient themselves in the longitudinal direction of the tube extruded from the die, the tensile strength of the biodegradable material is significantly greater in the longitudinal direction compared to the transverse direction. In order to orient these polymer molecules in a direction having a transverse component, a rotating die is used to twist the biodegradable material as it passes through the orifice. In particular, the outer ring of the extrusion die is rotated while the mandrel remains stationary. The rotation of the outer ring aligns the polymer molecules within the biodegradable material in a slightly transverse direction as they pass through the orifice. Depending upon the rotation speed of the outer ring and the extrusion speed of the biodegradable material through the orifice, the angle of orientation of polymer molecules within the biodegradable material may be adjusted. The tube of biodegradable material extruded from the rotating die has polymer molecules which are oriented spirally around the extruded tube. When the extruded tube with spirally configured polymer molecules is passed through the opposed flat rollers, the produced flat sheet comprises two layers, one having polymer molecules which are oriented in a direction with a transverse component to the left, while the other has polymer molecules which are oriented in a direction with a transverse component to the right. Again, the magnitude of the transverse component or the angle of the polymer molecules orientation is adjusted by changing the rotational speed of the outer ring and the extrusion speed of the biodegradable material. The sheet of biodegradable material thus produced, has polymer molecules oriented in a cross hatch pattern which produces greater strength in the transverse direction.

A preferred rolling device applies pressure to the extrudate substantially perpendicular to the direction of extrusion. The hot extrudate can simply be passed through opposed flat rollers (which may distort the shape imposed by the die). Generally, it is preferred that the roller or rollers apply pressure symmetrically to the hot extrudate conforming to the desired product shape, e.g., a rolled sheet is preferably employed for pressure molding of trays and like containers. Rollers can be made of stainless steel, teflon or a related materials that are inert to the extrudate. Rollers are preferably positioned with respect to the extruder die such that the hot extrudate can be directly fed into the rollers while the extrudate is still hot.

A compression or rolling step has not previously been applied to the production of expanded sorghum meal-based products. Preferred rollers are spring-loaded and the pressure applied is adjustable. While rolling is the preferred method for applying pressure to the extrudate to achieve desired properties in expanded articles, those of ordinary skill in the art will appreciate that other methods may be applied to achieve the desired result. It will also be appreciated that a variety of methods are available to stretch the extrudate. In particular, a variety of methods are available for stretching the extrudate before, during or after compression.

Preferably, rollers are positioned sufficiently close to the extruder die so that the extrudate remains hot during rolling. For ease of illustration, the roller device of FIG. 1 shows one set of rollers. Two or more sets of rollers in sequence can be employed in the processing method of this invention. The use of more than one set of rollers may improve process efficiency. However, generally care should be taken to keep the extrudate hot during the process of rolling. Rollers may be heated. For production of sheets, in particular, the use of two or more rollers may be preferable to achieve desired final properties.

The preferred extruder feed compositions of this invention contain sorghum meal and raw non-modified additional starch or rice flour. Minor amounts of additives, including lubricant, plasticizer, humectant, nucleating agent and another blowing agent (in addition to water) wherein the additives preferably comprise up to a maximum of 30% by weight of the total weight of the extrudate, may be added. If desired, but not required, the extrudates of the present invention may contain a minimum amount of plasticizers, including polyvinyl alcohol or ethylene vinyl alcohol (or other polyols) to obtain desired properties when processed by the improved extrusion/compression method described herein. In particular, extruder feed compositions preferably contain 0% but may contain less than about 5% by weight of polyvinyl alcohol or ethylene vinyl alcohol. The extruder feed compositions may contain less than or equal to about 2.5% by weight or contain less than or equal to about 1% by weight of polyvinyl alcohol or ethylene vinyl alcohol.

Water is typically added to the extruder feed during its passage through the extruder, most typically at the inlet portion of the extruder. Added water may generally represent about 30% by weight or less of the composition in the extruder. Additional variable amounts of water are present in the components of the feed, e.g., in the additional starch. The amount of water added in a given extrusion will depend on the extrusion conditions, the initial water content of the sorghum meal and/or starch used and the desired product. Generally, the amount of water in the extrudate is adjusted to maximize expansion of the extruded product, while avoiding a soft or runny extrudate. Water can be premixed with or added separately from other base mixture ingredients. For example, water can be added, and its addition adjusted and controlled, through inlet ports into the extruder. The amount of water that must be added depends on the moisture content of the sorghum meal and/or raw starch. The total water content of the base mixture prior to extrusion is typically between about 6% and about 30% by weight.

It has been found that pressure molded articles having suitable properties for packaging applications, such as containers and trays, can be prepared using extruder feed compositions which contain no polymeric or polyol plasticizer, e.g., no PVA or EVA.

The sorghum meal of the present invention, according to one embodiment, may be comprised of "NUTRI-BINDER" available from Industrial Grain Products, Inc., located at 711 East 46th St., Lubbock, Tex. 79404. According to the manufacturer, "NUTRIBINDER" is a sorghum meal comprised of the following components: not less than 9.4% by weight protein; not less than 2.0% by weight fat; not more than 3.0% by weight fiber; not more than 3.0% by weight ash; and starch. However, it is understood that other sorghum meal compositions may be utilized in the practice of the invention.

In preferred embodiments, this invention uses raw, non-modified, non-derivatized starch which is essentially starch as it occurs in nature other than having been physically separated from other plant components. The starch is typically a powder (fine or coarse) or granular. Corn starch is the preferred starch in this invention; however, any type of non-modified starch from sorghum, wheat, rice, potatoes, tapioca, or the like or mixtures of starches can also be used. Mixtures of starches from different plant sources can be employed. In addition, other natural or synthetic materials that comprise starch as a major component, for example rice flour, can also be used as the source of starch for the process of this invention.

The invention does not require the use of high amylose starch to achieve desired high flexibility or resiliency. The invention does not require the use of derivatized starch, such as starch which has been chemically reacted at the hydroxy groups (e.g. esterified, etherified or phosphorylated). The invention does not require preconditioning of starch by treatment with heat or pressure, gelatinization or destructurization of starch before addition to the extruder. Nevertheless, starch compositions comprising high amylose starch, modified or derivatized starch or starch compositions that are preconditioned, gelatinized or destructurized can be processed by the improved extrusion/compression or and compression and stretching process of this invention to provide extruded materials with improved properties for use as packaging materials. Mixtures of modified or otherwise treated starch and raw, non-modified starch can be employed in the methods of this invention. Preferred starch for use in this invention is predominantly non-modified starch, i.e. starch containing 50% or more by weight non-modified starch.

The rice flour that is useful in the practice of some embodiments of the present invention is any commercially available rice flour as known in the art.

Flexible, pliable or resilient expanded sorghum meal products of this invention can be prepared with no plasticizers, e.g., polyvinyl alcohol, ethylene vinyl alcohol or related polyol materials.

The pre-mixed base sorghum meal mixture, the extruder feed (including any added water, lubricant, glycerin or other ingredient) can be directly introduced into the extruder or the individual components can be added in any order into the extruder for mixing therein. In a preferred method of addition of the components, water and lubricant are added to the remaining ingredients in the extruder through independently adjustable inlets into the extruder. Extruder feed mixtures of this invention predominantly comprise sorghum meal, with amounts of starch or rice flour, and nucleating agent, such as corn meal or talc.

The preferred extruder feed mixture of this invention predominantly comprises sorghum meal and starch and/or rice flour with optional minor amounts of humectants, plasticizers, lubricants, nucleating agents and optional blowing agents and agents which function to reduce cell size. Glycerin, related polyols including pentaerythritol, and vegetable oil among others may, while not meant to be limited thereby, function during extrusion as humectants and/or lubricants to improve the flow properties of the mixture and provide smooth surfaces for extrusion. Polyvinyl alcohol, ethylene vinyl alcohol and related polymeric polyols may, while not meant to be limited thereby, function as plasticizers. Glycerin may, while not meant to be limited thereby, also function as a plasticizer. Talc, protein as grain meal, in egg albumin or blood meal or other protein sources, and materials which generate $CO_2$, like "Hydrocerol" (Trademark, Boehringer Ingelheim) may, while not meant to be limited thereby, function as nucleating agents.

Encapsulated sodium bicarbonate and citric acid mixtures, for example, "Hydrocerol," which generates $CO_2$ and sodium citrate (CF and BIH forms, for example, available from Boehringer Ingelheim), can, while not meant to be limited thereby, act as nucleating agents. Different forms of encapsulated material are available in which the encapsulated ingredients are released at different temperatures. Those of ordinary skill in the art can readily choose the appropriate form for a given application. In general, the form which releases at the lowest temperature compatible with the application is normally used.

Glycerol monostearate and other glycerol monoesters of fatty acids, for example, "Myvaplex," may, while not meant to be limited thereby, function to aid in formation of uniform small cells in the extruded material. Superheated water in the extrudate may act as a blowing agent. The extruder feed of this invention can also include additional minor amounts of blowing agents, including among others carbon dioxide, nitrogen, and carbonate salts including sodium, potassium and ammonium salts. Any vegetable oils or polyols employed in the base mixture are preferably pumpable. In general, the extruder feed mixture of this invention may contain combinations of one or more humectants, plasticizers, lubricants, nucleating agents and/or blowing agents. The maximum amount of these additives is preferably about 30% by weight of the total weight of the extruder feed mixture (including added water). The extruder feed mixture preferably contains a minimum of these additives needed to attain desired properties of extruded product. The mixture preferably contains no plasticizer or a minimum amount of plasticizer.

The present invention does not require the use of plasticizers during the processes to obtain flexible, non-brittle expanded products. The preferred extruder feed mixtures of this invention do not contain polyvinyl alcohol, polyethylene alcohol or related polymeric vinyl alcohols (or mixtures thereof). Extruder feed mixtures of this invention may, according to some embodiments, include those in which the amount of polymeric vinyl alcohol is less than about 5% by weight and, specifically, those having less than about 2.5% by weight as well as those having less than about 1% by weight of polymeric vinyl alcohol. PVA having different average molecular weights is available. Airvol 325 and Airvol 540, both available from Air Products, have been found suitable in extruder feeds of this invention. Extruder compositions of this invention may also contain relatively low levels of glycerin or other humectants.

Extruder compositions of this invention include those in which glycerin content is less than about 4.0% by weight and preferably those in which glycerin content is less than about 1.5% by weight.

Extruder compositions of this invention also include those in which talc content is between about 1% by weight to about 15% by weight and preferably those in which talc content is between about 1% by weight and about 5% by weight.

Glycerol monostearate (for example, "Myvaplex" (Trademark, Eastman Kodak) can be included in the extruder feed to provide, while not meant to be limited thereby, improved uniformity of cell size in the expanded starch. Glycerol monostearate is preferably included in the extruder feed in an amount ranging from about 0.1% to about 1.0% by weight. More preferably, it is present in an amount from about 0.20% to about 0.75% by weight.

For example, an extruder feed composition of this invention can contain the following ingredients expressed in weight percent: sorghum meal (about 20% to about 95% by weight); starch or rice flour (up to about 75 percent by weight), preferably the starch is predominantly raw, unmodified starch; added water (up to about 30%); vegetable oil (up to about 6%); glycerin (up to about 10%); polyvinyl alcohol or other plasticizer (up to about 35%, preferred 0%); glycerol monostearate (up to about 1.0%); additional blowing agent (up to about 0.8%); and talc (up to about 15%) with the provision that the mixture must contain a nucleating agent. Additional water and/or lubricant can be added during extrusion.

The extruder feed composition of this invention can optionally contain coloring agents, fragrances, bactericides and mould-inhibiting agents. The extruder feed may, while not needed, optionally include various sources of fiber, e.g., soy fiber. Fiber content can preferably range up to about 20% by weight of the extruder feed, but can be varied to adjust stiffness of extruded sheets and molded articles.

It has been found that sorghum meal-based materials that have been compressed into sheets and pressure molded may be recycled back into the extrusion process by grinding the materials very finely, and combining them with additional feed composition. For example, it has been found that the use of an extruder feed in which up to about 20% by weight of the feed is comprised of ground recycled extruded sorghum meal results in no significant detriment to properties of the final extruded, shaped product. Depending upon the desired final properties of the product, a higher or lower percentage of recycled material may be included in the extruder feed for processing.

The material as extruded is typically much lighter than the final product since the compressing or rolling increases bulk density. Expanded sorghum meal products have moisture content generally lower than the extruder feed material. Preferably, according to one embodiment, the compressed/rolled expanded products contain from about 5% to about 9% by weight moisture and more typically from about 6% to about 7% by weight moisture.

The mechanical properties of pressure molded and other expanded articles made by the methods of this invention can be evaluated, for example, by preparation of tensile and Izod bars according to ASTM test methods, D638-84 and D256-84.

The extruded expanded products of this invention are useful in applications of shaped articles for packaging materials. In particular, sheets produced by methods herein can be combined with paper and other biodegradable materials to make biodegradable laminated materials, such as mailing envelopes. Further, articles having a variety of shapes, including trays and other containers, can be produced by the methods herein combined with conventional methods of molding, particularly pressure molding.

The following examples, while not meant to be limiting, are illustrative of the present invention.

EXAMPLES

Preparation of Pressure Molded Expanded Sorghum Meal-Based Products

Extruded sheets useful for pressure molding of trays and other shaped articles with low brittleness, suitable flexibility and usefull dimensional stability were prepared using the extrusion compression method of this invention, exemplified by use of rollers to apply compression to the hot extrudate. Extruder feed compositions useful in this method include compositions detailed above.

The components of the feed mixture were mixed prior to their introduction into the extruder. Water was added independently to the extruder. The extruder employed was a Clextral BC72 co-rotative twin-screw which was adapted with feed screws, compression screws, and notched reversing screws. The extruder barrel had five (5) temperature zones. The mixture was plasticized in the extruder. In general, extruder conditions were set, as is known in the art, to provide smooth flow of extudate. More details provided below.

Screw Configuration #1

Screw configuration was optimized to the following:

| | | |
|---|---|---|
| 750 MM | ¾ Pitch | Conveying screw |
| 50 MM | ¾ Pitch | Reversing screw |
| 500 MM | ¾ Pitch | Forwarding screw |
| 100 MM | ⅓ Pitch | Reversing screw |
| 100 MM | ⅓ Pitch | Pressure screw |

Run 1

The extruder feed (in weight percent) used was: sorghum meal 47.00%; raw, non-modified corn starch 47.00%; Talc 5.2%; "Myvaplex" 0.52%; and Hydrocerol BIH 0.26%.

Screw configuration #1, Screw RPM 300 Tube Die (Assembly Dwg 2979025A) (BEI) die with adjustable outside die body, die body #2979025A, Mandrel #2979022A. Roller gap 0.8 mm. Sheet forward velocity 45 fpm (corresponds approximately to feed rate to extruder (i.e., extrusion rate). Feed rate 400 lb/hr.

| | |
|---|---|
| Z5 | 200° C. |
| Z4 | 200° C. |
| Z3 | 175° C. |
| Z2 | 100° C. |
| Z1 | 75° C. |

Water addition 1.1 lbs/min
Specific Mechanical Energy .078

The roller speed was set to correspond approximately to the feed rate so that sheets were rolled, but not stretched. Rolling improved sheet quality and assured more uniform moisture content throughout the sheet. Increased flexibility from rolling was apparent. Good quality trays (flexible with dimensional stability) were produced in this run.

Run 2

The extruder feed (in weight percent) used was sorghum meal 94% by weight; talc 5.2%; "Myvaplex" 0.2%; and Hydrocerol BIH 0.3%. The extruder conditions were:

Screw configuration #1, Screw RPM 500. Same die as in Run 1. Roller gap 0.203 mm. Roller speed 17 RPM. Feed rate 63 lb/hr.

| | |
|---|---|
| Z4 | 180° C. |
| Z3 | 100° C. |
| Z2 | 70° C. |
| Z1 | 136° C. |

Water addition 0.25 lbs/min
Specific Mechanical Energy 0.087

Excellent quality trays were made using this method.

Run 3

The extruder feed (in weight percent) used was: 47.00% sorghum meal; 47.00% rice flour; 5.23% talc; 0.24% Hydrocerol BIA; and 0.53% "Myvaplex."

All other conditions were the same as Run 1.

The resulting trays manufactured from this Run were of excellent quality.

Run 4

The extruder feed (in weight percent) used was: 31.33% sorghum meal; 31.33% rice flour; 31.33% raw, non-modified corn starch; 5.23% talc; 0.24% Hydrocerol BIH; and 0.54% "Myvaplex."

All other conditions were the same as in Run 1.

The extrudate was rolled and stretched and produced an excellent quality shaped tray article.

Extruder conditions were as follows:

Screw configuration #1, Screw RPM 300. Same die as in Run 1. Roller gap 0.203 mm. Roller speed 24 RPM. (Increased as feed rate increased). Feed rate 63 lb/hr. (Increasing to 101 lbs/hr.)

| Temperatures (° C.) | Z5 | 200 |
| --- | --- | --- |
| | Z4 | 200 |
| | Z3 | 175 |
| | Z2 | 100 |
| | Z1 | 75 |

Water addition 1.1 lbs/min
Specific Mechanical Energy .078

All of the references cited in this specification are incorporated in their entirety by reference herein.

Those of ordinary skill in the art will appreciate that variants, alternatives, substitutes and equivalents of the devices, methods, techniques, expedients, and ingredients specifically described herein may exist and that all such variants, alternatives, substitutes and equivalents that can be employed or readily adapted in the methods and compositions of this invention are within the spirit and scope of this invention which is defined by the appended claims.

We claim:

1. A biodegradable extruder feed composition for the production of expanded sorghum meal-based shaped packaging articles utilizing an extruder, said biodegradable exruder feed composition comprising:

from about 30% to about 95% by weight sorghum meal;
   from about 5% to about 15% by weight talc; and
   a blowing agent in an amount ranging up to about 1.5% by weight.

2. The composition of claim 1 further comprising up to about 50% by weight starch.

3. The composition of claim 1 further comprising up to about 50% by weight rice flour.

4. The composition of claim 1 wherein the sorghum meal comprises not less than about 9.4% by weight protein; not less than about 2.0% by weight fat; not more than about 3.0% by weight ash; and not more than about 3.0% by weight fiber.

5. The composition of claim 2 wherein the starch is derived from at least one selected from the group consisting of corn, tapioca, potato, sage, wheat, rye, pea, sorghum, rice, and arrow root.

6. The composition of claim 2 wherein the starch is derived from corn.

7. The composition of claim 2 comprising up to about 47% by weight sorghum meal and up to about 47% by weight starch.

8. The composition of claim 3 comprising up to about 47% by weight sorghum meal and up to about 47% by weight rice flour.

9. The composition of claim 1 further comprising corn starch and rice flour.

10. The composition of claim 9 comprising up to about 32% by weight sorghum meal, up to about 32% by weight corn starch, and up to about 32% by weight rice flour.

* * * * *